(12) United States Patent
Harbin

(10) Patent No.: US 8,196,536 B1
(45) Date of Patent: *Jun. 12, 2012

(54) APPARATUS TO REDUCE SKIN FRICTION DRAG ON A MARINE VESSEL

(76) Inventor: Lawrence Harbin, Alexandria, VA (US)

( * ) Notice: Subject to any disclaimer, the term of this patent is extended or adjusted under 35 U.S.C. 154(b) by 166 days.

This patent is subject to a terminal disclaimer.

(21) Appl. No.: 12/318,879

(22) Filed: Jan. 12, 2009

Related U.S. Application Data

(60) Provisional application No. 61/006,388, filed on Jan. 10, 2008.

(51) Int. Cl.
*B63B 1/38* (2006.01)
(52) U.S. Cl. .................................................... 114/67 A
(58) Field of Classification Search ................ 114/67 A, 114/67 R
See application file for complete search history.

(56) References Cited

U.S. PATENT DOCUMENTS

| | | | | |
|---|---|---|---|---|
| 4,429,652 A | * | 2/1984 | Stol | 114/20.1 |
| 4,825,795 A | * | 5/1989 | Slemmons | 114/140 |
| 5,117,882 A | | 6/1992 | Stanford | |
| 5,452,676 A | * | 9/1995 | Fiore | 114/291 |
| 5,524,568 A | | 6/1996 | Bobst | |
| 5,613,456 A | * | 3/1997 | Kuklinski | 114/67 A |
| 6,606,959 B1 | | 8/2003 | Shen | |
| 6,789,491 B2 | | 9/2004 | Takahashi | |
| 6,948,439 B2 | | 9/2005 | Burg | |
| 7,219,614 B2 | | 5/2007 | Stubblefield | |
| 2001/0022152 A1 | | 9/2001 | Takahashi | |
| 2002/0014192 A1 | | 2/2002 | Takahashi | |
| 2008/0276960 A1 | * | 11/2008 | Holsteyns et al. | 134/1.3 |

OTHER PUBLICATIONS pp. 9-10; Drag Reduction Technologies, V.T. Truong, Maritime Platforms Divisions, Areonautical and Maritime Research Laboratories, Jun. 2001.
ASME Conference Proceedings, Jul. 2006, Abstract.
Skin Friction Reduction by Microbubbles, Kato Hiroharu, Tokyo University, Japan, Feb. 1984.
Skin Friction Reduction by Introduction of Microbubbles Into Turbulent Boundary Layer, Mohanarangam et al, Dec. 2007.
Drag Reduction by Microbubbles in a Spatially-Developing Turbulent Boundary Layer, Ferrante, et al. Spring 2006.
Cloud Cavitation Control Using Vortex Generators, Hailing An, Purdue University, Jul. 14, 2005.

* cited by examiner

*Primary Examiner* — Stephen Avila
(74) *Attorney, Agent, or Firm* — Harbin & Hein PLLC

(57) ABSTRACT

An apparatus to reduce skin friction drag on a marine hull by imparting ultrasonically-induced cavitation at a boundary layer of a hull-water interface. The apparatus comprises a sonification plate mounted or adapted to be mounted on at least a portion of a wettable area of the hull (interior or exterior) to define a boundary layer region with the water medium, a power source to energize the sonification plate, and a controller to regulate the frequency and/or intensity of microcavitation bubbles produced at the boundary layer whereby to alter the Reynolds number, kinematic viscosity, and coefficient of friction. The sonification plate is hermetically sealed and includes an array of ultrasonic transducers therein, which may be mounted on all or a portion of the hull. Energizing the transducers nucleates microcavitation bubbles upon entrained gases and/or particulate matter residing in the water medium.

19 Claims, 8 Drawing Sheets

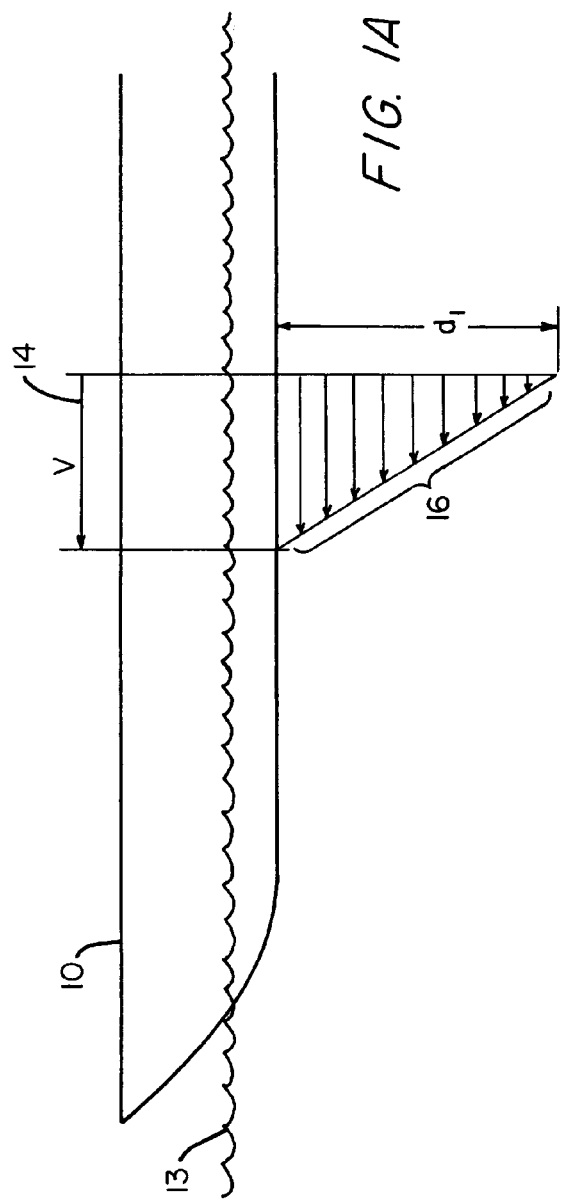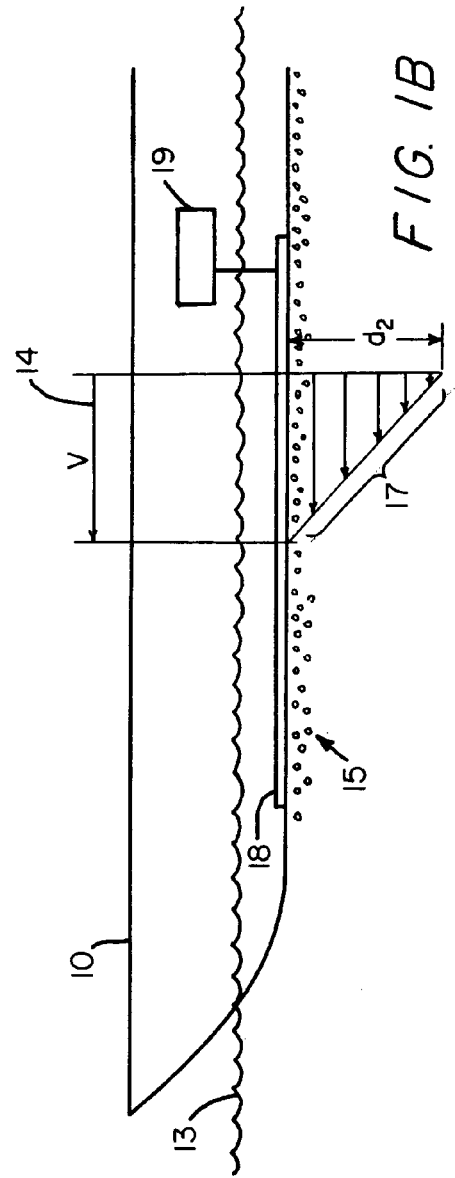

Light shading represents laminar flow

Dark shading represents turbulent flow

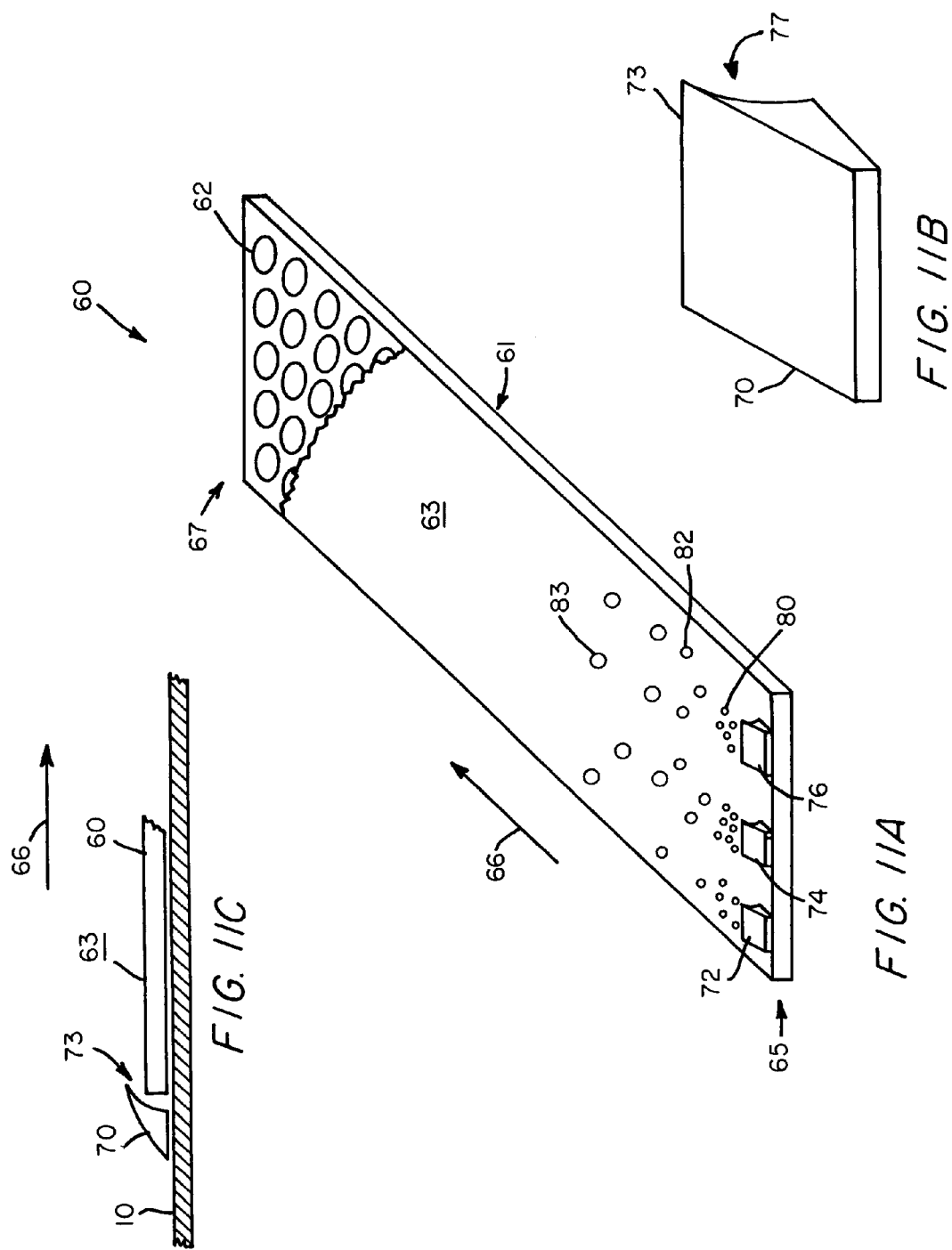

APPARATUS TO REDUCE SKIN FRICTION DRAG ON A MARINE VESSEL

CROSS-REFERENCE TO RELATED APPLICATION

This invention claims the benefit of U.S. Provisional Application Ser. No. 61/006,388 filed Jan. 10, 2008 in the name of the inventor hereof and entitled: Method and Apparatus to Microventilate a Hull of a Marine Vessel To Reduce Wetted Area Resistance.

BACKGROUND

This invention relates to marine vessels, but more specifically, to a method and/or an apparatus to improve efficiency of operation of a marine vessel by reducing skin friction drag or wetted area resistance while underway in order to provide more cost-effective marine transport services.

Fuel costs have suppressed growth of water transport services and leisure boating. In some cases marine transport services are cost prohibitive unless relegated to slower non-planing hull vessels such as pontoon boats, electric boats and the like operating on routes less than a few miles. Rising fuel cost is the primary obstacle as many vessels require several hundred to thousands of horsepower. Large commercial shipping vessels endure high costs and simply pass them on to their customers.

In the past, certain efforts to improve efficiency have been directed to reducing wetted area resistance of the ship's hull in order to lower frictional drag, horsepower requirements, and/or provide a higher hull or planing speeds. Drag due to wetted area resistance increases with velocity and the area of the wetted surface. To reduce drag, planing hull vessels reduce the area of the hull in contact with water by raising the bow. Other planing hull designs (e.g., a stepped hull configuration) provide hull ventilation to reduce the effective surface contact and wetted area resistance. Other attempts to reduce wetted area resistance include injecting air bubbles around submerged portions of the hull, providing air cushion beneath a hull (surface effect ships), and/or creating bubbles by negative pressure (venturi effect) and then routing the air bubbles to desired regions of hull. U.S. Pat. Nos. and patent publication nos. 5,534,568; 6,789.491; 7,219,614; 6,606,959; 5,452.676; 6,948,439; 2001/0022152; and 2002/0014192; exemplify such prior systems. Injecting air bubbles from the atmosphere requires substantial power. hull plumbing and orifices to route bubbles, which are subject to marine fouling. In addition, injecting air bubbles may induce unwanted cavitation in the region of the propeller. It may also be undesirable for a manufacturer to modify molds to incorporate hull plumbing. Surface effect ships have substantially flat hull bottoms thereby sacrificing smooth rides in rough seas.

SUMMARY

A first aspect of the invention comprises a hull of a marine vessel that includes a submerged region, a sonification plate forming at least part of the submerged region of the hull to establish a boundary layer between the plate and the water medium, and a source of power to energize the sonification plate to generate acoustic waves at a frequency and intensity to nucleate cavitation within the boundary layer. The said source of power may energize the sonification plate to generate acoustic waves having a frequency range of 16 KHz to 200 KHz and of a magnitude that exceeds tensile strength of the water medium in the boundary layer. The source of power has an associated a controller to regulate the intensity of the acoustic waves within the range of one to ten watts per square centimeter more or less in order to fracture a tensile strength of the water medium according to conditions of the water medium in the boundary layer, whereby to regulate the size and duration of cavitation bubbles. In effect, the controller regulates intensity and power of the source of power in accordance with nuclei residing in the water medium, and may control the frequency and/or intensity of the acoustic waves to regulate the size, duration, and/or density of cavitation bubbles in the boundary layer. Other aspects include a ventilation step forward of a running pad where the step includes a sonification plate on a submerged portion thereof whereby to further reduce wetted area resistance of said vessel. The vessel may include trim tabs retrofitted with auxiliary sonification plates whereby to further reduce wetted area resistance of said vessel. The insonifying device may be mounted on an internal surface of the hull to impart acoustic energy into and through the hull into said water medium, or may comprise a separate plate mounted on an exterior surface of said hull.

According to another aspect of the invention, there is provided a deep-V marine hull comprising a deadrise at a transom thereof greater than twenty degrees and at least one sonification plate disposed at a wettable area of the deadrise to nucleate cavitation bubbles at a boundary layer interface between the wettable area and the water medium. The deep-V vessel may include a source of power to energize the sonification plate to generate acoustic waves having a frequency range of 16 KHz to 200 KHz of a magnitude that exceeds tensile strength of the water medium in the boundary layer, and the source of power may include a controller to regulate the intensity of the acoustic waves within the range of one to ten watts per square centimeter more or less in order to fracture a tensile strength of the water medium according to conditions of the water medium in the boundary layer whereby to regulate the size and duration of cavitation bubbles.

According to another aspect of the invention, a submarine appendage of a marine vessel may have reduced wetted area resistance when proceeding through a water medium when a surface thereof is fitted with a sonification device that includes a series of ultrasonic transducers energized by a power supply to nucleate cavitation bubbles in boundary layer between the appendage and the water medium. The appendage may comprise one of a propeller, a rudder, a trim tab, or any other appendage extending in water.

According to yet another aspect of the invention, there is provided a marine sonification apparatus to reduce skin friction drag on a hull of a marine vessel when underway through a water medium, which comprises a series of transducers to impart acoustic waves in a boundary layer between the hull and water medium, a source of power to energize the transducers, and a controller to regulate frequency and intensity of acoustic waves according to conditions of the water medium when said vessel is underway. The sonification apparatus may further include a sealed plate in which the transducers are mounted, which plate is adapted to be mounted to the hull.

These and other aspects of the invention will become apparent upon review of the following description taken in connection with the accompanying drawings. The invention, though, is pointed out with particularity by the appended claims.

BRIEF DESCRIPTION OF THE DRAWINGS

FIG. 1A shows a hull underway through a water medium subjected to skin frictional drag.

FIG. 1B shows the hull of FIG. 1A equipped with a sonifying device to reduce wetted area resistance by nucleating cavitation bubbles at an interface between the hull and the water medium according to an aspect of the present invention.

FIGS. 11A, 11B, and 11C illustrate a sonification plates having sharp edge protrusions to augment nucleation of cavitation according to an aspect of the present invention.

DESCRIPTION OF ILLUSTRATIVE EMBODIMENTS

Figure 2:
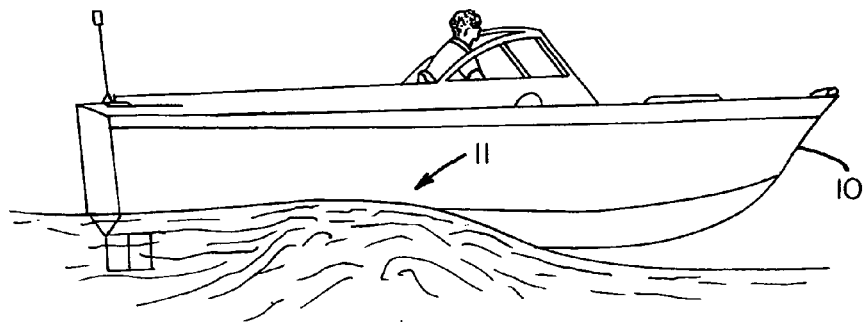
FIG. 2 illustrates a waterline profile of a planning hull vessel.

The present invention reduces drag due to wetted area resistance by altering the properties of the water medium that give rise to resistive drag. As generally accepted in the marine transport art, resistance to propulsion due to hydrodynamic drag includes skin friction drag, wave drag, and form drag. The total hydrodynamic drag force opposing propulsion $F_{HD}=½·C_R\rho v^2 A$, where $C_R$ is the coefficient of friction, $\rho$ is density of water, $v$ is the relative velocity between the vessel and the water, and A is the area of the wetted portion of the hull. In this relationship, the coefficient of resistance $C_R=C_{friction} C_{wave} C_{form}$. At higher speeds, drag from aerodynamic resistance also may come into play. Skin friction drag results from water clinging to the hull due to its viscosity and is often the dominant element in the opposing drag force. This invention is particularly directed to reduction of skin friction drag, which may as well have beneficial impact on other drag forces.

As the vessel moves through water, energy is wasted by needlessly pulling excess water along with the submersed hull. This results from the viscous interaction at the boundary layer between the hull and the surrounding water. Varying amounts of water is pulled according to whether the flow is laminar or turbulent. Assuming the hull is clean and smooth (which is rarely the case), flow is generally laminar at the initial portion of the bow and, depending on the vessel's speed, becomes turbulent at some point aft of the bow along the bow-to-stern path. Surface texture greatly impacts whether flow is laminar or turbulent. Also, the turbulent flow region of the hull needlessly pulls along more water than the laminar flow region because turbulent flow reaches deeper into the surrounding water to pull along more mass. In practice, the flow along a hull is mostly turbulent. Drag resulting from skin friction is directly related to the amount of water pulled along with the vessel's movement through water. According to an aspect of this invention, the viscous interaction between a marine hull and the surrounding water is reduced by imparting cavitation or microcavitation in and about the boundary layer at the hull-water interface.

Microcavitation, i.e., imparting micron-size air cavities, in the laminar and/or turbulent flow regions of the water immediately against the hull reduces skin friction drag thereby improving the vessel's performance. In effect, microcavitation alters the kinematic viscosity or the effective relationship density and/or viscosity of the water. Drag reduction can be appreciated from the generally accepted hydrodynamic drag force equation $F_{HD}=½·C_R\rho v^2 A$. If the water density $\rho$ decreases due to microcavitation, then so does the hydrodynamic drag force $F_{HD}$. According to the present invention, imparting cavitation or microcavitation is accomplished acoustically but may be achieved by other means such as applying intense heat or other energy to effectively fracture the water medium to create gas pockets in the medium at the boundary layer between the hull and the water medium. The principle is illustrated in FIGS. 1A and 1B.

FIG. 1A shows a hull 10 underway on a surface 13 of a water medium at a relative velocity V, the magnitude of which is represented by the length of velocity vector 14. Due to the viscous effects of the water medium, a series of velocity vectors 16 indicate the velocity gradient (scale is exaggerated for purposes of illustration) of water beneath the hull down to depth $d_1$ that is being pulled along with hull 10. In accordance with an aspect of the present invention, FIG. 1B shows a hull 10 retrofitted with a sonification plate 18 that is energized by a source of power 19 to nucleate micron-sized cavitation bubbles 15 in a boundary layer of the hull-water interface in order to alter the kinematic viscosity of the water medium in or near the boundary layer. In such a hull, the magnitude of velocity vectors 17 decreases more rapidly with depth. As a result, the velocity gradient 17 extends much shallower, i.e., depth $d_2$, so that less water is being "pulled" along or disturbed as the hull 10 proceeds through the water medium. Advantageously, skin friction drag is significantly reduced. In FIG. 1B, sonification plate 18 is shown mounted on an interior surface of hull 10 to impart acoustic waves through the hull into the surrounding water medium. Plate 18 may be integrated with the hull or comprise a separate plate mounted on an exterior surface of the hull. Sonification has the effect of reducing the apparent density $\rho$ of the water medium. Sonification frequencies may range between ten thousand to one hundred thousand hertz, but twenty thousand to one hundred thousand hertz is believed most effective. The magnitude and duty cycle excitation may be controlled according to conditions of the water medium, e.g., amount of entrained gases (air, nitrogen, $CO_2$), particulate matter, impurities, debris, temperature, salinity, and other factors that impact the degree of cavity nucleation and/or the tensile strength of the water medium through which the vessel proceeds.

Reducing the fluid density $\rho$ also moves the laminar-turbulent transition point further aft of the hull so that the hull experiences less turbulent flow. As indicated above, turbulent flow has a more deleterious impact on the vessel's performance. As known in the art, the point of transition between laminar and turbulent flow is a function of the Reynolds Number $R_e$ where $R_e=(\rho vL)/\mu=vL/\eta$, where L is the length of travel of fluid along the hull, $\rho$ is the density of water, $v$ is the velocity of the vessel relative to the water, $\mu$ is the dynamic viscosity of the water, and $\eta$ is the kinematic viscosity of the water. In addition, viscosity is affected water temperature and salinity. In the shipping industry, it is generally accepted that $C_f=0.075/(\log_{10}Re-2)^2$. Thus, decreasing the kinematic viscosity η of the water by inducing cavitation has the effect of increasing the Reynolds number and decreasing the coefficient of drag $C_f$.

This invention also provides a method and an apparatus that takes advantage of entrained gases, minerals, particulate matter, and/or impurities that normally exist within lakes, rivers, and oceans where vessels normally operate. Such contaminants facilitate formation of ultrasonically induced cavities. In particular, the invention utilizes ultrasonically-induced cavitation and/or microcavitation techniques to produce small bubbles or cavities within the water in order to break wetted area resistance along at least part of the wetted area of a submersed or planing hull. In effect, the invention provides a method and apparatus to "microventilate" a hull. Cavitation implosion events, however, may not and need not occur in order to break surface tension on wetted area. Conventional wisdom in the marine industry, on the other, teaches away from cavitation and advocates measures to avoid the same.

Employing cavitation techniques by nucleating bubbles on contaminants residing in the water is particularly advantageous in high-speed (e.g., 30+ knots) planing hull vessels since only a portion of the hull, not the entire hull, reduces the wetted area on which cavitation apparatus need be deployed, e.g., only on the planing portion of a hull or along a running or keel pad. Deed-V hulls, which ride better in rough seas, may now become practical and efficient when retrofitted with sonification plates. Without such retrofit, operation is cost-prohibitive due to large amounts of power required to overcome skin friction drag resulting from the relatively large wetted area of the hull immersed deep into the water medium.

Sonifying sea or fresh water with acoustic wave energy induces cavitation bubbles and causes migration of entrained air within the water to regions of induced cavitation and consequent growth of air bubbles to produce larger air bubbles to further help break the viscous grip of water along wetted regions of the hull. Advantageously, the present invention may be adapted as a retrofit for both newly manufactured or after-market vessels without requiring significant structural modification of a hull. In an exemplary embodiment of the inventions, a commercially available acoustic wave or high-power ultrasonic generator activates a series of ultrasonic transducers ganged together within a sealed housing (hereafter called a "sonification plate").

Smaller sonification plates may also be incorporated in trim tabs or amidship planing regions of a stepped hull vessel to further reduce wetted area resistance, and the plates may be geometrically arranged to preserve lateral and yaw stability against any asymmetric force or hull resistance due to an electrical failure of one of the plates or independent sections thereof. Advantageously, acoustic sonification plates are self-cleaning since any marine fouling or growth will rapidly break away from the surface thereof upon activation of the transducer array within the plate.

Figure 3:
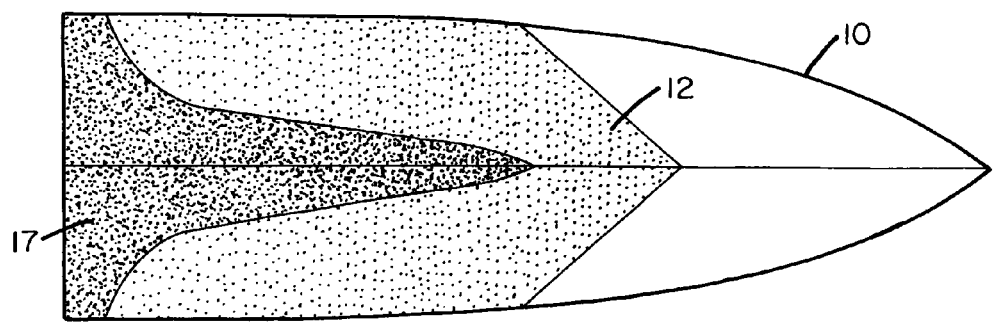
FIG. 3 illustrates regions of laminar and turbulent flow on the hull of the vessel shown in FIG. 2.

FIG. 2 shows a hull 10 of a vessel having its planing region 11 located amidship while on plane. The laminar flow area of the hull, illustrated as region 12 of FIG. 3, may lie at many regions of a hull depending on hull design. Flow in region 17 is generally turbulent and creates more drag than the laminar flow region 12. The wetted area also varies according to loading and weight distribution within a vessel. Because only a small fraction of the hull of a high-speed planing vessel remains in the water when on plane, only a small portion of the hull need be retrofitted with a sonification device. Also, such sonification device may be placed in the turbulent flow region 17 to reduce drag at its highest drag point of the hull. Thus, the required power to induce cavitation becomes practicable.

Figure 4:
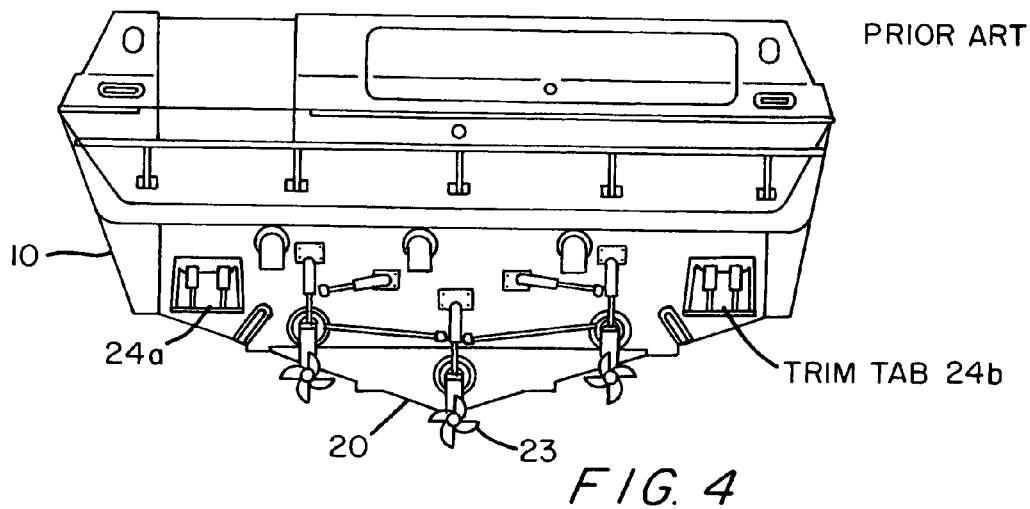
FIG. 4 shows a modified deep-V hull having chines and a running pad (or pad keel) on which the vessel rides when on plane.
Figure 5:
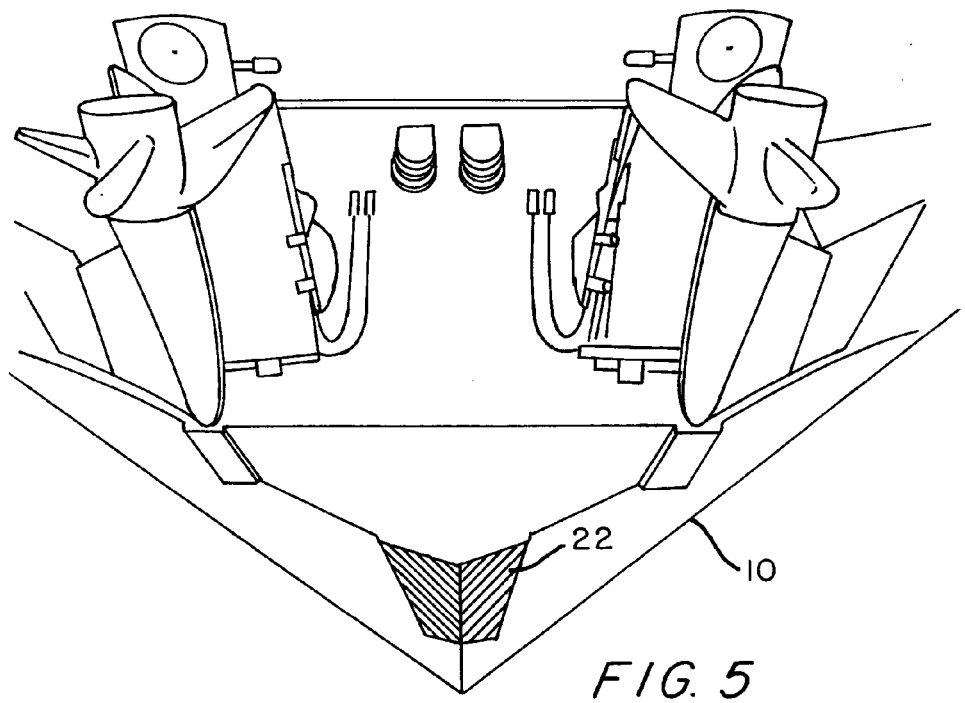
FIG. 5 illustrates a sonification plate mounted on a running pad of the vessel shown in FIG. 4 according to an aspect of the present invention.

In the hull of a high performance or racing vessel, as illustrated in FIG. 4, a running or keel pad 20 may be provided upon which the vessel rides at high speed. In this case, it is advantageous to provide a sonification plate directly on the aft region 22 of the keel pad, as shown in FIG. 5. The ultrasonic plate may, for example, extend four to five feet forward of the transom in a vessel having a water line length of thirty-five to fifty feet. The width of a typical keel or running pad for such a vessel is about fifteen to eighteen inches. In this case, care must be taken not to induce excessive bubble growth since a propeller 23 (FIG. 4) may be located aft of the sonification plate. Once the bubble passes the sonification plate, however, they begin to collapse and may disappear before reaching the propeller region. Since the inception of cavitation is somewhat dependent upon conditions (turbidity, suspended particles, water temperature, entrained air, etc.) of the water medium, transducer excitation power level, duty cycle, frequency, and other parameter may thus be controlled automatically (with sensors and feedback control) or manually (by the vessel operator) in order to confine cavitation bubbles where needed instead of far aft of the stern. Hull 10 of FIG. 4 also includes a pair of trim tabs 24a and 24b, which may also be equipped with sonification plates on an underlying side thereof.

Figure 6:
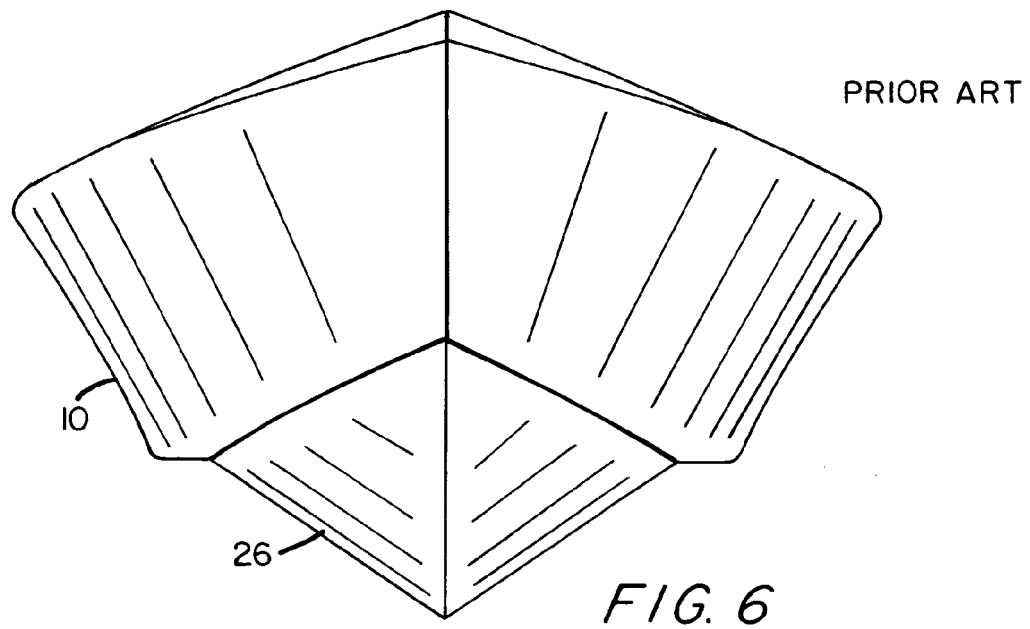
FIG. 6 shows a conventional deep-V hull form.

FIG. 6 shows another hull 10 to which cavitation plates may be affixed to wetted area of the vee-bottom 25. As indicated above, such hulls may advantageously have a deeper V and higher deadrise angle at the transom, e.g., twenty-five to forty or more degrees and yet maintain efficient operation.

Figure 7:
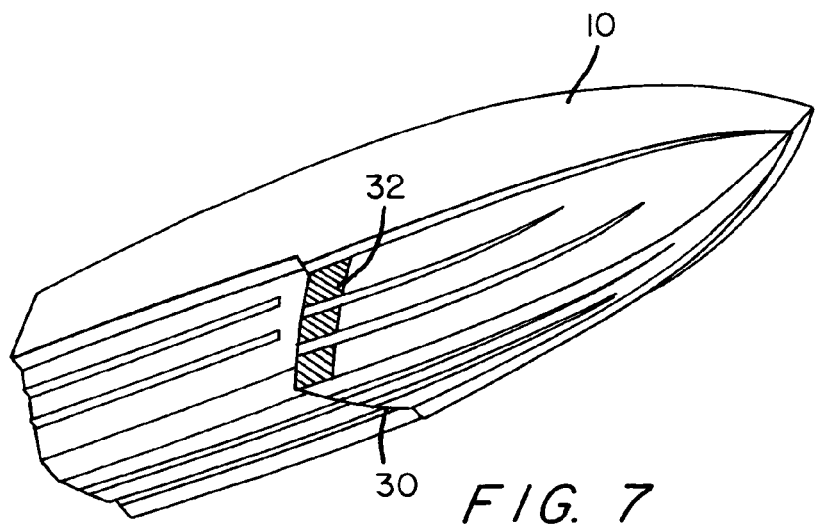
FIG. 7 shows a stepped hull form that includes Sonifying plates according to an aspect of the present invention.

FIG. 7 shows a hull 10 that includes step 30 extending laterally across an amidship section thereof that serves to breaks flow aft of the step and to provide hull ventilation to reduce wetted area resistance aft of the step. Multiple steps may be provided on a hull to improve ventilation. According to an aspect of the present invention, a lower wetted area resistance and even greater efficiency can be achieved by providing a band of sonification plates 32 (depicted on the starboard side only for illustrative purposes) that traverse the beam forward of the step. A single elongated ultrasonic plate may also be provided. Additionally providing such plate(s) forward of the steps significantly reduces the overall wetted area resistance on a stepped hull 10 and also improves lateral stability against the thrust of a stern drive.

Figure 8:
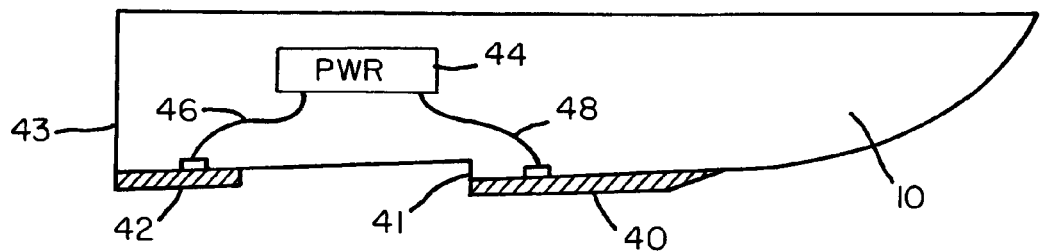
FIG. 8 shows a stepped hull that includes sonification plates and a power source according to an aspect of the present invention.

Placement of sonification plates underneath both forward of a step and near the stern 43, as illustrated in FIG. 8, assures reduction of resistance at nearly all high-pressure regions of the hull during planing. As shown, plate 40 lies forward of step 41 and plate 42 is provided at the aft section of the vessel. Plates 40 and 42 are excited by power supply 44 (ultrasonic generator) via respective interconnecting coaxial cables 46 and 48 extending through fittings within the hull of vessel. As known in the art, power supply 44 (acoustic wave generator) may produce a variety of excitation waveforms to vary in wave shape, frequency, intensity, duty cycle, etc. to excite acoustic transducers of the cavitation plate according to a desired size, density, intensity, or duration of cavitation bubbles. The present invention, however, includes controlling and adjusting the excitation parameters of the generator to achieve desired vessel operation to reduce wetted area resistance according to the conditions experienced at sea or on the water. In many cases, the vessel operator may visually observe trailing bubbles or sense propeller cavitation as an indicator to alter the operating parameters of the acoustic wave generator to achieve or counteract any undesired operation.

Further, the invention may include providing trim tabs directly aft of a stern-mount sonification plate in order to utilize the larger induced bubbles thereat in order to break or reduce wetted area resistance at the trim tabs. Likewise, bubbles generated at forward-mounted steps of a stepped hull may be utilized to break or reduce wetted area resistance at the stern region (e.g., running or keel pad) or at the trim tabs.

Figure 9:
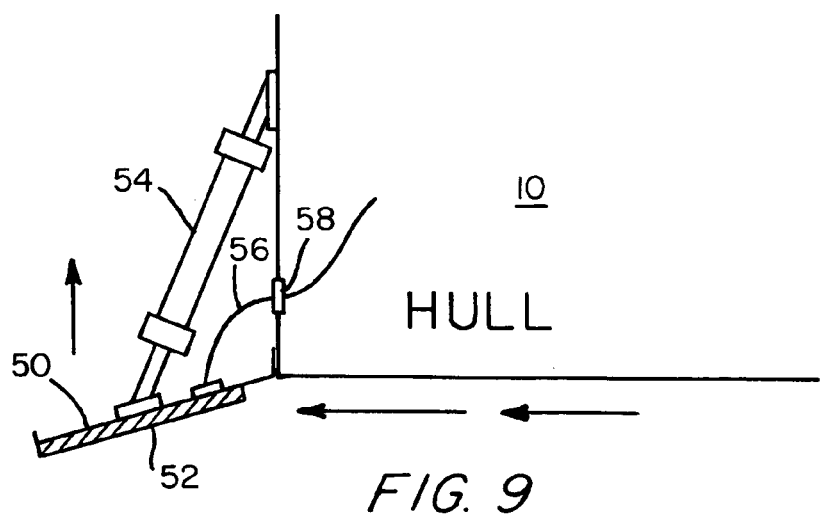
FIG. 9 shows a trim tab appendage of a vessel retrofitted with a sonification device according to an aspect of the present invention.

FIG. 9 shows placement of an acoustic insonfication plate 52 on the underside of a trim tab, which is subjected to higher pressure form drag and increased wetted area resistance resulting from forward motion of the vessel. Plate 52 is also powered by a power supply (not shown) via cabling 56 extending through through-hole fitting 58. The trim tab is actuated by hydraulic ram 54.

Figure 10:
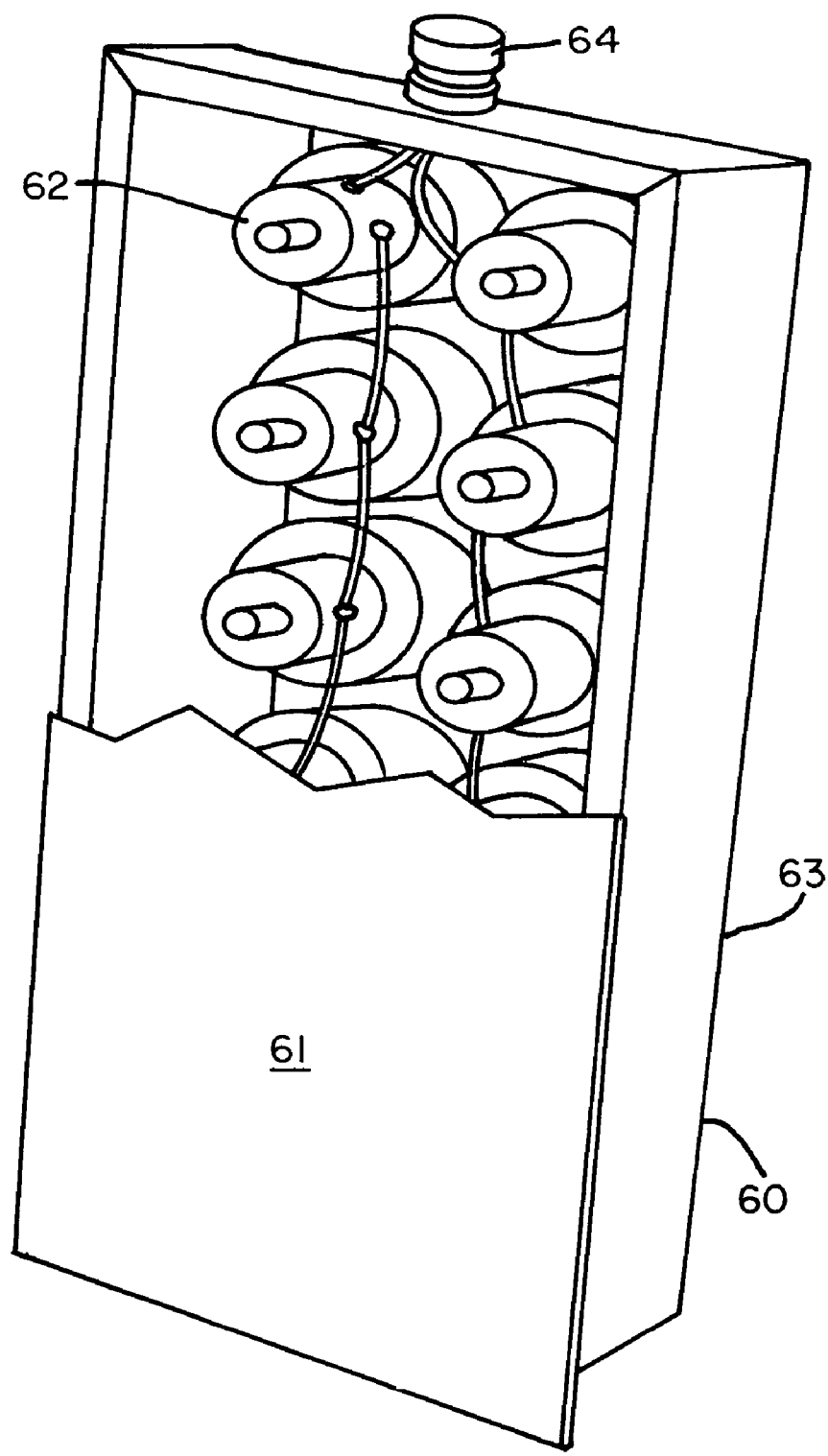
FIG. 10 shows a sonification plate embodying a series of transducers housed in a sealed casing that may be mounted on a hull of a vessel according to an aspect of the present invention.

FIG. 10 shows a commercially-available transducer assembly used in the ultrasonic cleaning industry that may be modified and incorporated into the present invention. The off-the-shelf assembly has a front-to-back thickness of about one to three inches and imparts acoustic energy to liquid at about ten kilowatt per square meter (i.e., about one watt per square centimeter) according to transducing efficiency. Focused transducers may also be employed to concentrate acoustic energy to a smaller area in order to facilitate nucleation of cavitation. As shown, assembly 60 illustrated in cut-a-way view has a rear surface 61 mounted against regions of the vessel's hull and a cavitation side 63 that nucleates cavitation at an interface with water upon excitation of acoustic transducers 62 within the housing of assembly 60. Typical transducers are fabricated from as arrayed series of lead zirconate or lead titanate crystals. Cavitation bubbles thus appearing on surface 63 of assembly 60 thus reduce wetted area resistance.

The size, intensity, density, duration, of microcavition bubbles may be controlled by altering the frequency, intensity, and/or duty cycle of an acoustic driver. Lower frequencies impart greater energy to water in order to tear apart the liquid at any phase boundaries therein, while higher frequencies induce smaller bubbles. Salt water has a greater density than fresh water. Also, colder water is denser and has a greater tensile strength requiring more energy incite cavitation. At a vessel speed of sixty miles per hour, for example, a bubble will travel along a four feet elongated cavitation plate for about forty-five millisecond, this exposing the bubble to nine hundred acoustic cycles of a 20 KHz acoustic wave. This is believed adequate to grow bubbles by a process known as rectified diffusion. The length of the plate and the frequency and power of excitation of the transducers may be adjusted to achieve adequate bubble growth, as needed to reduce wetted area resistance. Cavitation or insonifying plates shorter in the downstream direction require more energy, i.e., lower frequency or higher excitation intensity. After passing the acoustic plate, the bubble begins to dissipate or, if large enough will float to the surface of the water after having performed its function of reducing wetted area resistance.

Commercially available transducer assemblies utilized in the ultrasonic (or megasonic) cleaning industry range in size from six to ten inches wide and from about one to five feet long. Power consumption ranges from a few hundred to a few thousand watts. Frequency of operation ranges from about 20 KHz to about 300 KHz. The lower range of frequency. e.g. 20-40 KHz, imparts greater energy to the water and increases bubble size. Lower frequency magnetostrictive (typically less than 25 KHz) or higher frequency piezoelectric transducers may be employed.

In accordance with the present invention, a relatively flat sonifying plate may be contoured with the hull of a vessel, flush-mounted against wetted area regions of the hull, and/or affixed by conventional bolting or marine grade cement. In order to prevent damage due to cavitation erosion, the cavitation plates are mounted to direct acoustic waves away from the hull or any of the vessel operating components, such as propeller, sensors, trim tabs, etc. Ultrasonic transducers within cavitation plates are excited by the on-board generators of the vessel or other power source.

An extension of the invention includes dispersing/ejecting particulate matter or disrupting the laminar flow region forward of the sonifying plate to enhance cavity or bubble formation along the surface of the cavitation plate. A venturi effects edge or sharp projections may be utilized to stimulate bubble formation by interrupting laminar flow or by lowering the pressure within the laminar flow stream while the vessel is underway. Minute air bubbles may also be injected or the laminar flow region may be seeded with vacuous bubbles. As illustrated in FIG. 11A, bubbles spawned in the seeded region are then further grown and/or multiplied through rectified diffusion and bubble collapse by exposure to acoustic waves of the cavitation plate. Cavitation may also be hydrodynamically enhanced utilizing a backward facing step 72 to disrupt laminar flow.

FIG. 11A shows an acoustic insonification plate 60 (inverted for purposes of illustration) having an upstream end 65 and downstream end 67 in the presence of a high velocity water stream flowing in direction 66 along surface 63 of the cavitation plate. Plate 60 embodies a series of transducers 62 to produce acoustic waves that emanate substantially normal to surface 63 at an intensity in the order of one to ten watts per square centimeter, more or less. The underside 61 of plate 60 is mounted to a wetted region of a hull. In this embodiment, surface 63 of plate 60 includes a series of flow disruptors 72, 74, and 76 (illustrated in the form of backward facing steps) mounted at or near the upstream end 65 of plate 60. These flow disruptors include sharp step or edge that utilize venturi effects to create minute bubbles 80 by breaking laminar flow and/or by lowering the tensile strength of the water to facilitate inducement of cavitation by acoustic waves generated near surface 63 as bubbles flow past plate 60. As illustrated, bubbles 80 are exposed to acoustic waves generated over surface 63 so that they grow to larger bubbles 82, 83, etc. Eventually, bubble density reaches a level to lower the effective viscosity and density of the water so as to reduce frictional forces acting against the hull. The dynamic state of the fluid mixture becomes part liquid and part gas in the vicinity of the insonification plate, i.e., a vapor cloud suspended within a generally viscous laminar flow stream. Flow disruptors, in effect, may be considered an additional or auxiliary step in a stepped hull vessel since they also help "ventilate" the hull and break wetted area resistance. This invention, however, enhances ventilation by growing bubbles through acoustic wave energy.

FIG. 11B depicts an exemplary flow disruptor 70 having a sharp protrusion 73 on a downstream edge thereof. Instead of providing a series of flow disruptors 70 along an upstream end 65 of plate 60, a continuous or elongated flow disruptor may span the width of plate 60 to produce a two-dimensional cloud of bubbles at the upstream end. Backward face 77 of disruptor 70 may be flat rather than contoured or curved, as shown.

FIG. 11C shows positioning flow disruptor 70 against hull 10 so that the sharp edge 73 extends over the surface 63 to form a cloud of bubbles along plate 60. Plate 60 and disruptor 70 may also be integrally formed rather than being in separate elements. Disruptors 70, 72, 74, and 76 may be replaced with venturi tubes, nozzles, or injectors to achieve the same or similar effect, e.g., atomizing or lowering the vapor pressure in the laminar flow stream. When disposed on or near the cavitation plate, such elements remain pristine clean when exposed to acoustic waves, which rapidly clean marine fouling for their surfaces and edges.

Figure 11D:
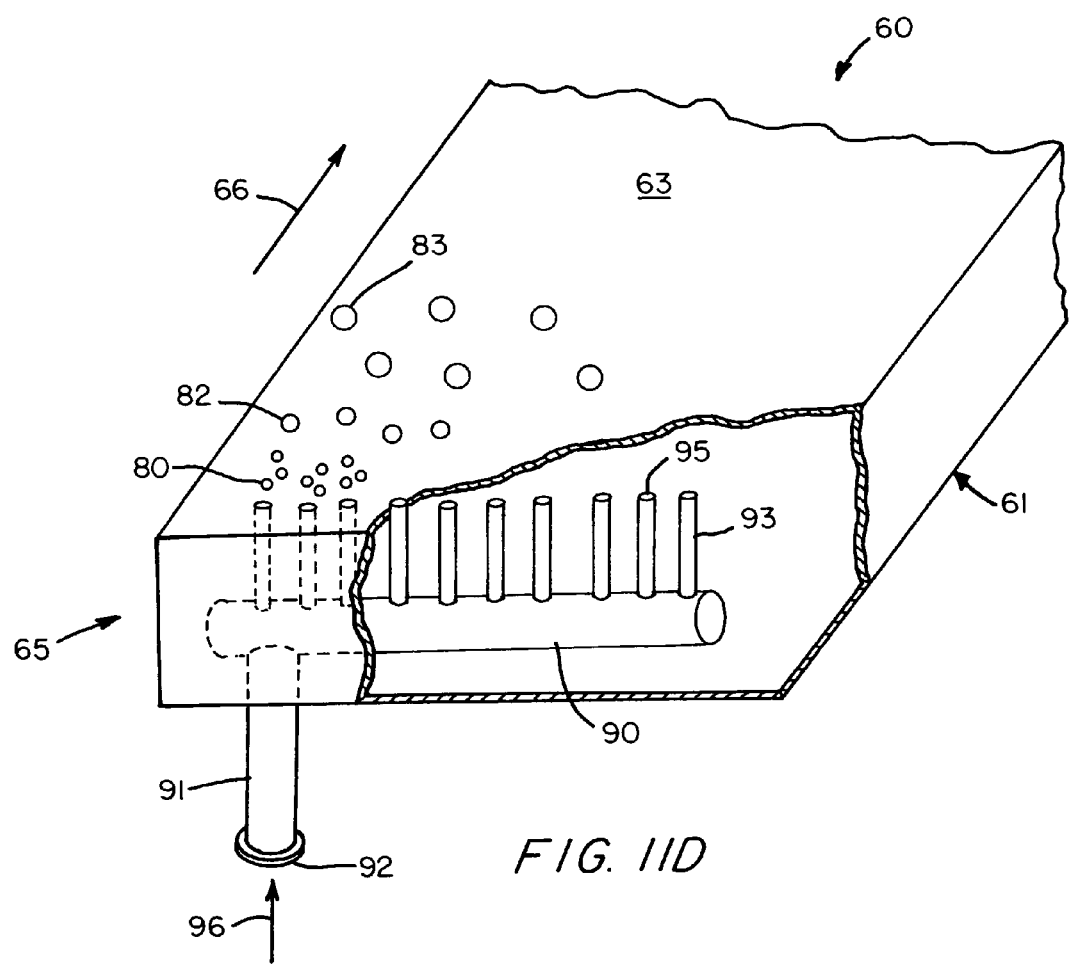
FIG. 11D illustrates an alternately bubble-seeding mechanism to augment nucleation of cavitation according to another aspect of the present invention.

FIG. 11D shows an alternative embodiment to stimulate bubble growth where insonification plate 60 (inverted for purposes of illustration) includes an air plenum 90 located near an upstream end 65 of the insonification plate, which during operation of the vessel, is disposed on a wetted surface of laminar flow denoted by the direction of arrow 66. Plenum 90 is supplied with pressurized gas 96 (e.g., air pressure in the range of 200-600 psi) via conduit 91 through an opening 92 extending through the hull of a vessel, which carries an air pump to produce the source of pressurized gas. A series of nozzles or jets 93 have small orifices 95 protrude through surface 63 of the insonification plate to seed the laminar flow region with air cavities 80. Seeded cavities are then grown to larger air bubbles 82 and 83 via rectified diffusion when exposed to acoustic waves emanating from surface 63. Bubbles are also multiplied and populated by acoustic waves. Depending on the magnitude of pressure supplied to plenum 90, the size of orifices 95 may range from a fraction of a millimeter to several millimeters. Again, the orifices 95 remain clear of marine fouling by way of exposure to insonifying energy produced by ultrasonic transducers (not shown) housed by the insonification plate 60. Instead of pressurize air, carbon dioxide in gaseous form or dissolved in water may be injected. Pressurized exhaust gas from the vessel's engine (s) may also be injected thereby obviating a need for an independent pressure source.

The invention advantageously allows antifouling bottom paint on racing hulls that normally must be stored landside, or on lifts, since it rides only on the wetted area of its microcavitation plates. The invention also enables a high speed vessel to have a low resistance rudder equipped with a microcavitation plate on each side thereof. The invention may also enable a microventilated propeller where a surface of each blade thereof incorporates a "microventilation" of sonification plate. Any submerged appendage of a vessel may be equipped with sonifying transducers to reduce wetted area resistance.

The invention is not limited to the embodiment shown or described as variations may come to those skilled in the art.

I claim:

1. A surface-planing hull of a marine vessel that proceeds through a water medium with reduced frictional drag, said hull comprising:
    a reduced submerged region while planing,
    a sonification plate mounted near an aft region of said hull and forming at least part of said submerged region of said surface-planing hull to establish a boundary layer between said plate and the water medium when said hull is underway through said water medium, said sonification plate extending substantially over a wetted area near said aft region of said hull,
    a source of acoustic power to excite said sonification plate to generate acoustic waves in said boundary layer at a frequency and intensity to nucleate cavitation within said boundary layer, and
    a controller to enable activation of said source of acoustic power according to operational status of said vessel.

2. The hull of claim 1, wherein said source of power energizes said sonification plate to generate acoustic waves having a frequency range of 16 KHz to 200 KHz of a magnitude that exceeds tensile strength of the water medium in said boundary layer.

3. The hull of claim 2, wherein said controller regulates the intensity of said acoustic waves within a range of one to ten watts per square centimeter more or less in order to fracture a tensile strength of the water medium according to conditions of the water medium in said boundary layer, whereby to regulate size and duration of cavitation bubbles according to one or more of entrained air, particulate matter, impurities, debris, temperature, and other factors that impact degree of nucleation and tensile strength of said water medium.

4. The hull of claim 2, wherein said controller regulates intensity and duty cycle of said source of power in accordance with cavitation nuclei residing in said water medium.

5. The hull of claim 2, wherein said controller controls the frequency and/or intensity of said acoustic waves to regulate size, duration, and/or density of cavitation bubbles in said boundary layer in accordance with conditions of water medium.

6. The hull of claim 2, wherein said hull has a running pad on which the hull planes when underway and said sonification plate is positioned in a region of said running pad.

7. The hull of claim 6, further including a ventilation step forward of said running pad, and said step includes a sonification plate on a submerged portion thereof whereby to further reduce wetted area resistance of said vessel.

8. The hull of claim 2, wherein said vessel includes trim tabs that include auxiliary sonification plates thereon whereby to further reduce wetted area resistance of said vessel.

9. The hull of claim 1, wherein said sonification plate comprises an internal surface of said hull fitted with an insonifying device to impart acoustic energy into and through said hull into said water medium.

10. The hull of claim 1, wherein said sonification plate comprises a separate plate mounted on an exterior surface of said hull.

11. A deep-V planing marine hull comprising a deadrise at a transom thereof greater than 20 degrees and at least one sonification plate disposed near an aft region of said planing hull at a wettable area of said deadrise, said sonification plate being powered by an acoustic generator and extending substantially over said wetted area near said aft region of said hull whereby to nucleate cavitation bubbles at a boundary layer interface between said wettable area and a water medium while said vessel is on plane.

12. The deep-V hull of claim 11, wherein said acoustic generator includes a source of acoustic power to excite transducers of said sonification plate to generate acoustic waves having a frequency range of 16 KHz to 200 KHz of a magnitude that exceeds tensile strength of the water medium in said boundary layer.

13. The deep-V hull of claim 12, wherein said source of power includes a controller to regulate intensity of said acoustic waves within a range of one to ten watts per square centimeter more or less in order to fracture a tensile strength of the water medium according to conditions of the water medium in said boundary layer, whereby to regulate size and duration of cavitation bubbles.

14. The deep-V hull of claim 13, wherein said controller regulates frequency of said source of power in accordance with nuclei residing in said water medium.

15. The deep-V hull of claim 13, wherein said controller controls duty cycle and/or intensity of said acoustic waves to regulate size, duration, and/or density of cavitation bubbles in said boundary layer in accordance with conditions of water medium.

16. A hull of a marine surface vessel that proceeds through a water medium with reduced frictional drag, said hull comprising:
- a sonification plate forming at least part of a wettable surface of said hull, said sonification plate including a series of acoustic transducers to impart acoustic waves at a boundary layer interface between said water medium and said wettable surface,
- an acoustic generator to energize the transducers with an acoustic signal having an intensity sufficient to nucleate cavitation bubbles upon cavitation nuclei in said water medium, and
- a controller to control at least one of frequency, intensity, and duty cycle of said acoustic signal to grow cavitation bubbles to a desired number, size, or density within said boundary layer in accordance with surface conditions of the water medium and exposure time of said cavitation bubbles to acoustic waves produced by said transducers in relation to speed of said vessel whereby to effectively reduce frictional drag encountered by said vessel.

17. The hull of claim 16, wherein said sonification plate has a length and associated number of transducers in a fore-aft direction of said vessel to impart multiple acoustic cycles to the water medium in the boundary layer in order to grow said cavitation bubbles by rectified diffusion to said desired number, size, and density in relation to the speed of said vessel.

18. The hull of claim 17, wherein said acoustic generator imparts an acoustic energy to said water medium of one to ten watts per square centimeter, more or less.

19. The hull of claim 18, wherein said generator operates within a frequency range of 16-200 kHz.

* * * * *